United States Patent [19] [11] 3,838,453
Buslik et al. [45] Sept. 24, 1974

[54] TRACK FOLLOWING SYSTEM FOR MAGNETIC TAPE RECORDER

[75] Inventors: Walter S. Buslik; Dale H. Pennington, both of San Jose, Calif.

[73] Assignee: International Business Machine Corporation, Armonk, N.Y.

[22] Filed: May 18, 1972

[21] Appl. No.: 254,669

[52] U.S. Cl. ........................ 360/70, 360/77, 360/84
[51] Int. Cl. ........................ G11b 21/04, G11b 21/10
[58] Field of Search 179/100.2 T, 100.2 R, 100.2 S; 178/6.6 A, 6.6 P; 340/174.1 H, 174.1 K

[56] References Cited

UNITED STATES PATENTS

| | | | |
|---|---|---|---|
| 3,663,764 | 5/1972 | Trost | 179/100.2 T |
| 2,986,725 | 5/1961 | Dirks | 179/100.2 T |
| 3,644,910 | 2/1972 | Smith | 179/100.2 R |
| 3,651,276 | 5/1972 | Clark | 178/6.6 A |
| 3,666,897 | 5/1972 | Harr | 178/6.6 P |
| 3,654,387 | 4/1972 | Louth | 179/100.2 T |
| 3,534,344 | 10/1970 | Santana | 179/100.2 |
| 3,327,053 | 6/1967 | Arimura et al. | 178/6.6 |

*Primary Examiner*—Vincent P. Canney
*Assistant Examiner*—Alfred H. Eddleman
*Attorney, Agent, or Firm*—Nathan N. Kallman et al.

[57] ABSTRACT

A helical or transverse track tape recorder used for data recording and readback utilizes a scanning magnetic head that follows recorded data tracks precisely. The tape has prerecorded pairs of servo reference signals of opposite characterization that are located adjacent to the beginning of each data track, the pairs of reference signals straddling the center line drawn through and extending from each track. A servo system responsive to the sensed position of the scanning head relative to the paired reference signals compensates for any displacement of the data tracks relative to the scan path of the head. Read after write during the same scan period is also accomplished.

14 Claims, 9 Drawing Figures

PATENTED SEP 24 1974

3,838,453

SHEET 3 OF 3

TRACK FOLLOWING SYSTEM FOR MAGNETIC TAPE RECORDER

BACKGROUND OF THE INVENTION

1. Field of the Invention

This invention relates to a helical or transverse scan data tape recorder employing a track following system.

2. Description of the Prior Art

In presently known data processing systems, storage is accomplished by means of peripheral equipment, such as magnetic tape recorders or magnetic disc files. Magnetic tape storage is relatively inexpensive compared to disk storage, and can be made more compact thereby achieving a savings in space. Also, tape handling may be made relatively easy with a minimum of human operator time, particularly if the tape is stored within cartridges that are automatically selected from a tape library.

However, tape systems suffer from dimensional instability and stretch of the tape and misguiding. These problems are particularly detrimental in rotary head tape recording systems, wherein the rotary head assembly generally has one or more magnetic transducers at its periphery that can scan the tape transversely or obliquely. In such systems, it becomes necessary to synchronize the angular position and velocity of the rotating head to the longitudinal movement of the tape. This type of recorder has been mostly used in television systems that employ a prescribed standard format, including vertical and horizontal sync pulses which are interleaved with the video signal. These sync pulses are employed as reference signals in servosystems to maintain proper frequency and phase of the rotary head. In addition, prior art systems use a control signal recorded along the length of the tape for maintaining synchronism of the moving tape relative to the recorded tracks and the position of the rotary head assembly. These systems require a separate control or servo head, in addition to the read-write head. By use of sync pulses, control signals, and a control head in a servosystem arrangement, correction is provided for spurious changes in rotational head speed or tape linear speed. Such correction may also account for longitudinal tape stretch.

It would be highly desirable to employ a helical or transverse scan tape recorder for processing binary data, especially for high density data storage. To this end, it would be required to pack the recorded discrete tracks very close on the tape. But with a compactly recorded track arrangement, it is necessary, during the read mode particularly, to follow each data track accurately with the scanning rotary head. If the head were displaced a significant amount from the centerline of the data track, it would receive a fringing signal from the adjacent track, and the system would experience crosstalk interference, signal distortion and error. Thus, provision must be made for a track following system to ensure that there would be no loss of data, or no erratic signal readout.

Although prior art systems have provided compensation for changes in longitudinal speed of the tape and longitudinal tape stretch, the problems of lateral displacement resulting from poor guiding of the tape, and from longitudinal and lateral tape expansion or contraction, have not been resolved for the purpose of accurate track following in a helical or transverse scan recorder.

Also, in data storage systems, it would be advantageous to be able to read data just recorded to determine validity, and check for errors, and provide error correction where necessary.

SUMMARY OF THE INVENTION

An object of the invention is to provide a novel and improved helical or transverse scan tape recorder.

Another object is to provide a tape recorder employing a track following system for recording and reading data.

Another object is to provide a helical or transverse scan tape recorder that compensates for tape expansion and lateral stretch and displacement of the tape.

A further object of this invention is to provide a helical or transverse scan tape recorder utilizing the same magnetic head assembly carrying one or more transducers for writing and reading data, and additionally for serving as a servo head.

A still further object is to provide a helical or transverse scan tape recorder wherein data tracks may be scanned accurately while the tape is advanced or incrementally moved, or while the tape is standing still.

A further object is to provide a storage system with the capability of achieving read after write during the same scan of the head assembly.

In accordance with an embodiment of this invention, a helical scan tape recorder includes a track following servosystem, wherein a rotary magnetic head precisely scans a predetermined data track. Servo signals of opposite characterization are prerecorded in alternating fashion and serve to delineate the path of each data track between paired servo signals; and are used for maintaining the centerline of each data track in accurate alignment with the scanning path of the rotary head.

Another feature of this invention is the provision of a servosystem that stores the polarity and amplitude of an "off-track" signal and modifies the tape velocity on the fly, or adjusts the phase or position of the tape in an incrementing or stop mode.

In one particular embodiment, the servosystem incorporates a capstan drive stepping motor coupled to a variable period monostable multivibrator or single shot, that responds to a stored DC error signal representing an off-track condition. The single shot advances an up-down counter, and controls the motor step rate, thus establishing a proper transducing relationship between the rotary head and the data track.

In addition, the magnetic tape recorder incorporating this invention allows the use of two transducers closely spaced along the periphery of the rotary head assembly, so that immediate read after write is made possible.

A further feature of this invention is that the timing for the recording system is derived from the recorded servo signals.

BRIEF DESCRIPTION OF THE DRAWINGS

The invention will be described in greater detail with reference to the drawings in which.

Similar reference numerals refer to similar elements throughout the drawings.

DESCRIPTION OF THE PREFERRED EMBODIMENT

Figures 1, 1A:
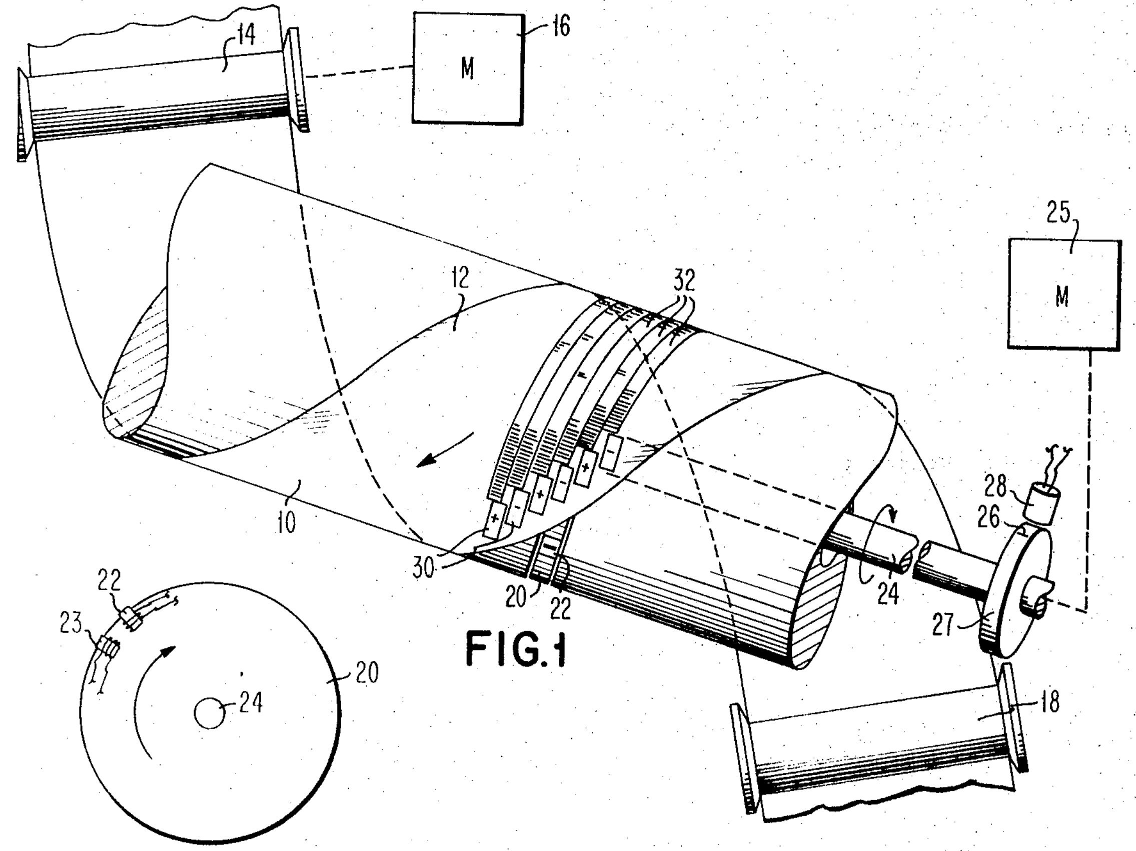
FIG. 1 is an isometric view, partly in section, representing a helical scan tape recorder assembly, including a wrapped tape and a rotary head, in accordance with this invention.
FIG. 1A is an axial view of a head assembly, used in the recorder assembly of FIG. 1.

FIG. 1 is a representation of a helical scan type magnetic recorder, with only a portion shown for simplicity and convenience. Tape reels and other parts, well known in the art, are not illustrated. The assembly shown includes a stationary drum 10 around which a magnetic tape 12 is wrapped and transported. The tape 12 is driven by a capstan 14 powered by a motor 16, which may be a D.C. motor or step motor, by way of example. The tape is guided by guide post means 18 between a supply reel and takeup reel (not shown).

A rotary head structure 20 is positioned in a spacing of the drum 10, and supports one or more magnetic transducers that protrude from the drum periphery, to allow transducing engagement with the tape that traverses the spacing. In a preferred embodiment, a write transducer 22 and read transducer 23 are mounted in a closely spaced relation, about 10° apart along the periphery of the head structure 20. The head structure 20 is mounted to a shaft 24 that is rotated by a drive means 25 at a predetermined speed.

An index transducing element 26 is fixed to a wheel 27 on the shaft 24, to provide an index pulse, when sensed by a sensor 28. The element and sensor assembly may be of the photoelectric or magnetic type, as is known in the art. The index pulse is developed once for each revolution of the shaft 24 and wheel 27, and serves to indicate the angular position of the shaft and accordingly that of the rotary head assembly 20. The index pulse is also used to time the beginning and end of each data track, and the starting and stopping of the tape.

In keeping with this invention, a progression of uniformly and closely spaced servo or reference signals 30, alternating in polarity or opposing phase, are prerecorded along the length of the tape 12, near to one edge, for example. The recording of the servo signals may be accomplished by a rotating magnetic head and circuit applying pulses of different polarity alternately as the tape is moved at a substantially uniform speed; or by magnetic transfer of a master pattern, for example. It should be understood that the spacing and pattern of the reference signals 30 are not prescribed or limited by any standards, such as found in television or video information systems. The spacing and uniformity of spacing of the servo signals on the tape may vary without affecting the effectiveness of the track following accomplished by means of the present invention.

Once the reference servo signals are registered preferably permanently, on the tape 12, data track paths 32 are effectively delineated, and data will be recorded and read along these defined paths, notwithstanding expansion or stretch or misguiding of the tape. The recorded servo signals and associated servosystem electronics serve as constraints and confine each data track to a path centered along a line extending between the servo signals of each pair.

Figure 2A:
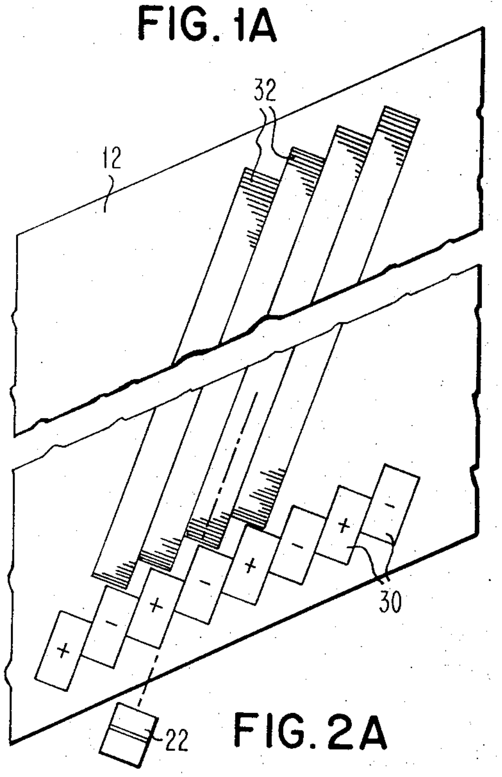
FIGS. 2A and 2B are plan views of recorded data tracks and associated servo signal patterns, as utilized with this invention.

A single line pattern of servo signals 30 is illustrated in FIG. 1, and again in enlarged form in FIG. 2A. In this pattern, a pair of servo signals of opposite polarities are located at the beginning of each data track, so as to straddle the extension of the center line of the data track that runs obliquely across the tape. Since the servo signals 30 are located at the beginning of each track 32, and servo and data are recorded close together, any change in tape dimensions or motion affects both servo and data in the same area to the same degree.

Figure 2B:
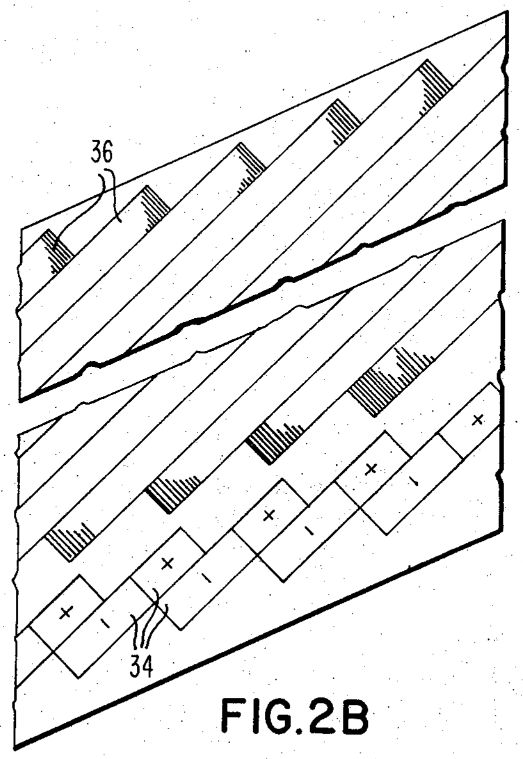

FIG. 2B depicts another servo pattern, in accordance with this invention, utilizing a staggered or step configuration, such that the servo signals 34 are paired in the direction of rotary head scan along data tracks 36, as well as being paired in the direction of tape motion. This arrangement eliminates the need for reversal of circuit logic.

Figure 3:
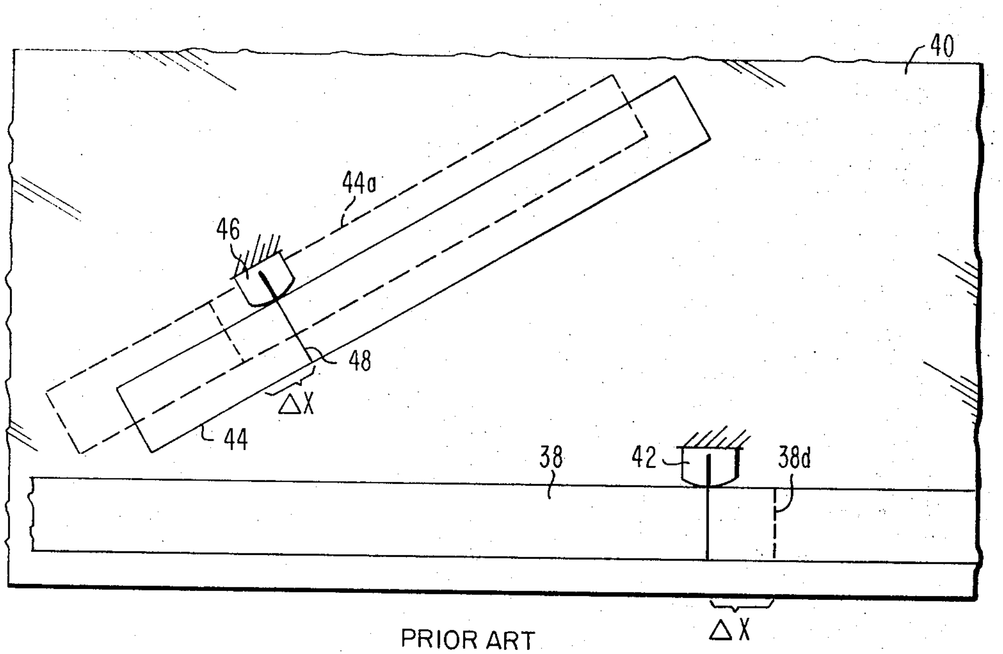
PRIOR ART FIG. 3
FIGS. 3 and 4 are exemplary representations of prior art arrangements, for purpose of explanation.

Prior art rotary head systems for television recording, as represented in FIG. 3, used first, a transducing signal from index 48, indicative of the angular position of the rotary head and second, the vertical synchronizing signal in the television signal. This first control signal and the vertical sync signal were used to control the velocity and phase of the rotary head in the recording mode, so as to record the vertical sync signal near the beginning of the helical scan across the tape. During the record mode, a third control signal derived from and coincident with the vertical sync signals in the television signal, was recorded by a fixed transducer 42 on control track 38.

During playback, the third control signal is read back by transducer 42 from control track 38 and is compared in phase with the first control signal from transducer 46, and the phase error is used to control the speed of the tape, to insure head path to track alignment.

However, if there were to be either dimensional changes in the tape, laterally or longitudinally, or if there were tape displacement laterally, the prior art control system would experience a deterioration of head to track alignment. For example, if the tape were to expand longitudinally by $\Delta X$, the third control signal on track 38 may move to a position **38*d* ($\Delta X$ to right), relative to track 44**.

As a consequence of the control action of the system, which maintains coincidence of the third control pulse **38*d* under transducer 42 and the first control signal 48 under transducer 46, the track 44 would be moved to position 44*a* which is not wholly coincident with the path 44** of the rotary head.

Similarly, a lateral shift of the tape would result in head to track misregistration. To avoid this, television tape recording systems require elaborate and precision type guiding elements with costly mechanical and electrical compensation for change in tape pressure, tape misguiding and tape stretch. Adjustment of the tape guides, at the factory and out in the field, is usually necessary.

Figure 4:
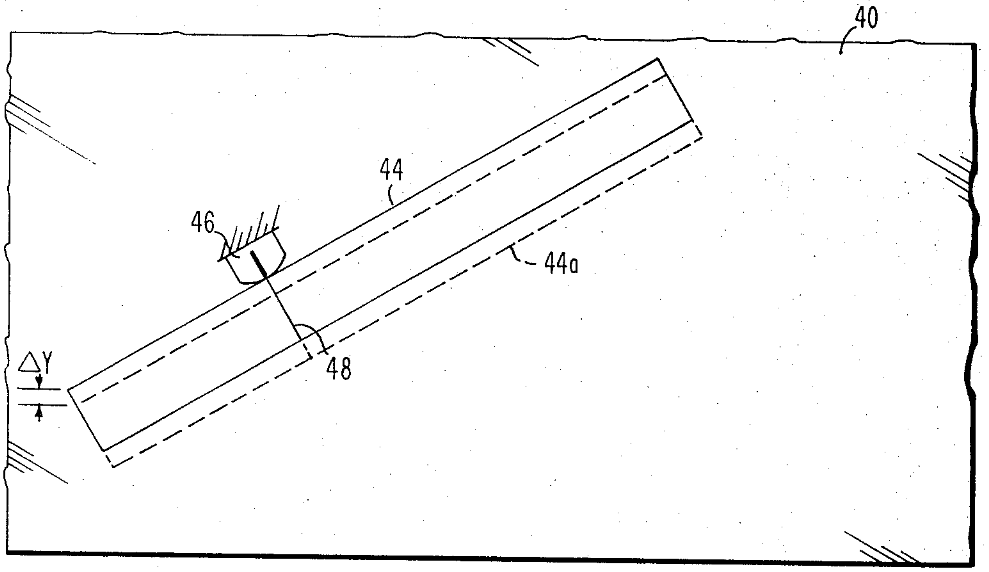
PRIOR ART FIG. 4

FIG. 4 illustrates an alternate method employed in prior art. A first control signal is again derived from transducer 46 and index 48 and is indicative of angular position of the rotary head. Again, this first control signal and the vertical sync signal from the television signal were used to control the velocity and phase of the rotating head in the recording mode, so that coincidence of these two signals was maintained.

In the readback mode, the tape speed is varied, so that coincidence between the first control signal from transducer 46 and the vertical sync pulse read back from the tape was maintained.

FIG. 4 also illustrates the problem encountered, in this method, when the tape is displaced laterally due to inaccuracies in the guiding, by an amount ΔY. Coincidence of the first control signal from transducer 46 and the vertical sync pulse being read back by the rotary head is maintained even though the record 44*a* has been shifted partially out of the path of the rotating head 44, and read-back signal degradation will result.

Figure 5:
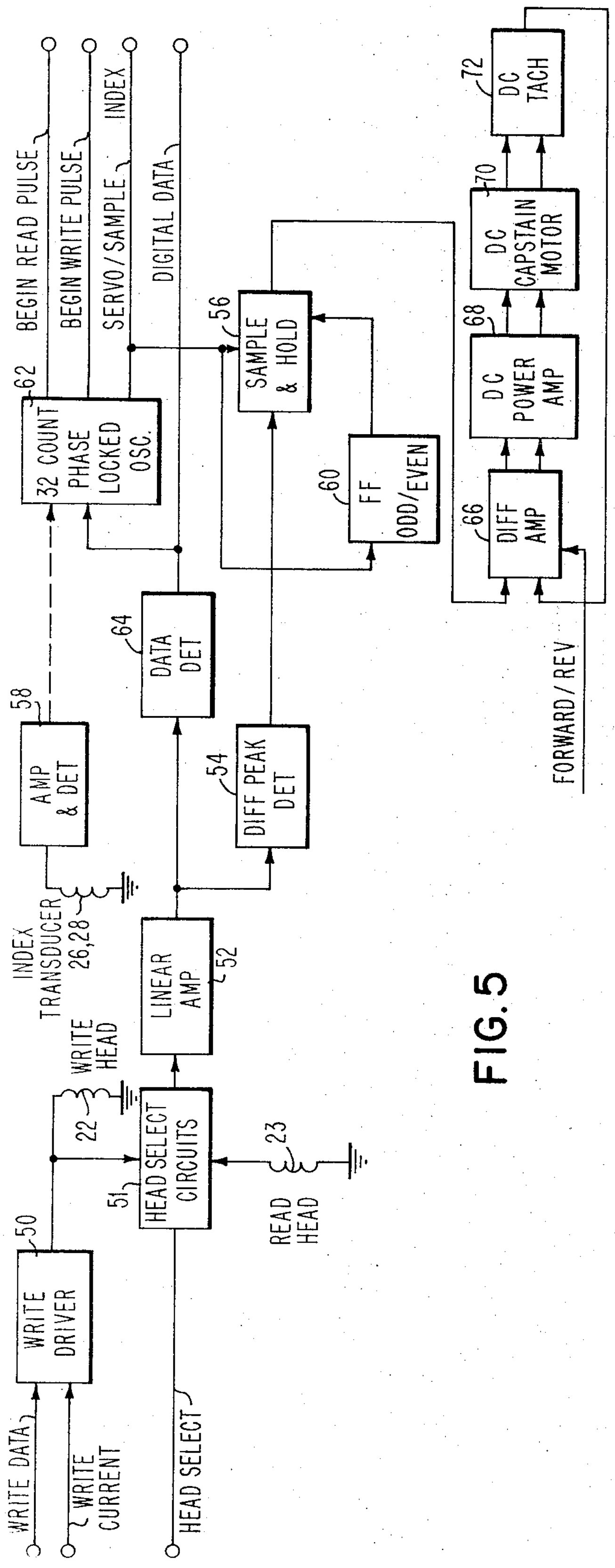
FIG. 5 is a schematic block diagram of a servosystem employed with the tape recorder assembly of this invention.

In accordance with this invention, a servo system illustrated in FIG. 5 is employed in conjunction with the pattern of prerecorded servo signals on the tape to achieve accurate track following by the rotary head along the data tracks. The system can be switched between read and write modes in reference to command signals received from an external control unit or central processing unit. Although the specific embodiment illustrated employs a separate write transducer 22 and read transducer 23, a single transducer may be employed for both functions, including Servo Read. Also, with two transducers as depicted in FIG. 1A, either or both transducers may read the servo field prior to writing or reading data.

As shown in FIG. 5, Write Data and Write Current signals are applied to a write driver 50 to initiate the write mode. At such time, the write transducer 22 is switched to the write driver circuit by a head select circuit 51. However, in accordance with this specific embodiment of the invention, the write transducer 22 is first selected for the servo read function and thus is coupled to the detection circuit, prior to being selected for the write function. The read transducer 23 is coupled to the detection circuit for data detection, when the write transducer is in the write mode.

During the data write mode, the write transducer 22 first traverses the servo signals 30. The width of the transducing gap is approximately the width of a data track, and thus senses about one half of each of a pair of adjacent servo signals in an ideal condition.

Initiation of the reading of the servo field is determined by an index pulse generated by the index transducer 26 and sensor 28. At such time, the transducer 22 reads the servo field, and the detected servo signal, obtained from a pair of adjacent recorded servo tracks, is switched through a linear amplifier 52 to a differential peak detector 54 that senses if the signal is more positive or negative. This signal is representative of the relative position of the pair of sensed servo tracks and the rotating transducer. The servo data that is read by the magnetic transducer 22 and amplified in linear amplifier 52 is a differential AC signal. The peak detector 54 converts the AC signal to a differential DC voltage, that is supplied to a sample and hold circuit 56. The amplitude of the differential DC signal is the algebraic sum of the differential peak positive and negative pulses. The timing of the sample and hold circuit is controlled by the index pulse from the index sensor 28, channeled through amplifier and detector 58, to control a bistable multivibrator or flip flop 60, that changes state for each revolution of the wheel 27. This reversal of logic state accounts for the reversal of the order of polarity of the paired servo signals 30, from positive and negative to negative and positive, and vice versa, as illustrated in FIG. 2A. When using the servo pattern of FIG. 2B, the flip flop arrangement is not needed, because the positive servo signal track is always on the left and the negative one is on the right, for any given pair.

The sample and hold circuit 56 holds the DC output level, which is representative of the direction and magnitude of displacement of the centerline of the data track relative to the scan path of the rotary head. In effect, the circuit 56 samples the output of the peak detector 54, while the transducer 22 is in a field of servo information performing a readout function, and establishes a DC control voltage that is used for controlling the positioning system, until the next sample is taken. Each sample either adds or subtracts a small amount of electrical charge on a hold capacitor (not shown) in the sample and hold circuit. The amount and the polarity of the voltage change on the hold capacitor is proportional to the amplitude and direction of the DC position error. The DC control voltage that appears on the hold capacitor is used to control the speed of the capstan drive motor 70. Thus, for each revolution of the rotary head assembly 20, a correction voltage is applied to either speed up or slow down the tape capstan drive and thus the tape itself, so that the result is an accurate tracking of the data by the rotating write and read transducers.

To this end, the output of the sample and hold circuit 56 is directed through a differential amplifier 66 and DC power amplifier 68 to the DC capstan motor 70 that drives the tape. A DC tachometer 72 coupled to the capstan motor senses the velocity of the motor 70 and provides a signal to the differential amplifier 66 in a closed loop feedback system. A control unit provides a forward or reverse logic signal to the closed feedback loop to determine whether the capstan motor is to move in one direction or the other.

A phase lock oscillator 62 is provided in the circuit of FIG. 5 to divide the 360° head revolution into equal increments, in this case, by way of example, 32 increments of 11.25° each, by means of a divider counter. In a specific embodiment, three of the thirty two counts are decoded to provide appropriate logic level timing pulses, designated as Begin Read, Begin Write, and Index.

In operation, the phase lock oscillator 62 is synchronized to the first magnetic transition of servo data that is sensed, prior to entry of the magnetic transducer 22 on the data track, or to an index transducer on the head rotor shaft. The transducer 32, after sensing the servo data, moves into the data track path to begin writing binary data, and is followed by the read transducer 23 that achieves the immediate reading of the written data upon receipt of the Begin Read command.

Figure 6:
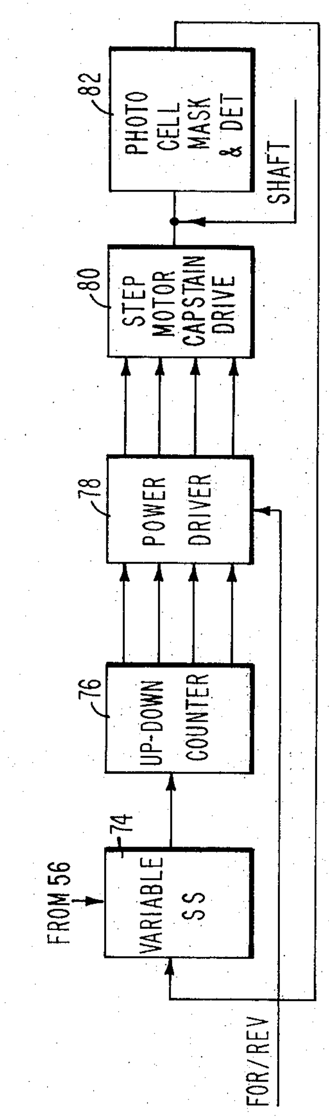
FIG. 6 is a block diagram depicting an alternative circuit for a portion of the servosystem of FIG. 5.

With reference to FIG. 6, another motor feedback loop is shown as an alternative to the DC capstan motor loop of FIG. 5. In this embodiment, a step motor capstan drive 80 is part of a velocity feedback system that responds to a DC control voltage received from the sample and hold circuit 56. A photocell mask is positioned on the step motor shaft to cooperate with a photocell and detector assembly 82 to generate the velocity feedback information. The photocell assembly 82 produces a pulse for each step taken by the step motor 80, and the step pulses are fed back to trigger a variable period single shot 74. At the end of each time out period, the single shot 74 goes positive. The positive signal is applied to an up-down counter 76, thereby advancing the counter by 1, either up or down, depending on whether the forward-reverse line is positive or negative. In a sense, the up-down counter 76 acts as a commutator, to select a motor winding of the drive to which a power driver 78 applies current. Thus, each photocell pulse confirms that the step mirror has responded to the last counter advance instruction. The step rate which, in effect, becomes the tape speed is controlled by the length of the single shot period which, in turn, is determined by the DC control voltage.

Figure 7:
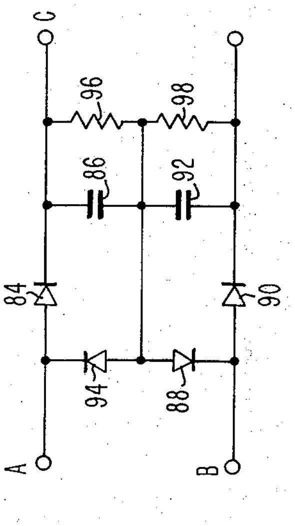
FIG. 7 is a schematic circuit diagram of a differential peak detector, as found in FIG. 5.

FIG. 7 depicts the elements of one form of the differential peak detector 54. In operation, detector 54 rectifies the servo data transitions to separate the positive pulses from the negative pulses. The peak amplitudes of the positive and negative pulses are stored on separate capacitors 86 and 92. The two peak amplitudes, positive and negative, are then algebraicly summed. The resultant value is a DC voltage having a polarity indicative of the displacement of the head from the track centerline, and having an amplitude proportional to the amount of displacement of the head from the track centerline.

By way of example, an off-track differential signal having positive and negative pulses, say 3 volts and 1 volt respectively, is applied to the input of the peak detector 54. While the positive pulse is present, current flows in terminal A (see FIG. 7) through a unilateral conducting device or diode 84, capacitor 86 and diode 88 and out through terminal B. As a result, a charge of 3 volts is applied to capacitor 86. While the negative pulse is present,current flows through terminal B, diode 90, capacitor 92 and diode 94, and out through terminal A. In this case, a charge of 1 volt remains on capacitor 92.

The differential output is then the algebraic sum of the charges on capacitors 86 and 92, which sum is 2 volts in this example, with terminal C being positive. Resistors 96 and 98 discharge the capacitors 86 and 92 slowly before the magnetic transducer 22 scans another field of servo data at the beginning of the next revolution.

As another example, an on-track differential signal, having 2 volts positive and 2 volts negative pulse, would store equal charges on capacitors 86 and 92, thereby providing a zero volt DC output, indicative of zero position .

There has been described herein a novel servosystem cooperating with a data track and servo track combination in a helical or transverse scan magnetic recorder, to ensure that a rotary head scans along a data track in a precise defined path centered about the centerline of the data track. The recorded servo field includes registered signals alternating in polarity along the direction of tape motion, each pair of adjacent signals straddling the centerline of a data track.

The servosystem converts the summation signal that is developed from each pair of servo signals by the rotary head to a DC error voltage, which is applied to a feedback loop that controls the tape drive. In one embodiment, a step motor is controlled by means of a variable single shot that determines the stepping rate.

It should be noted that the servosystem of this invention can be used for both read and write modes. In addition, although this embodiment describes the tape as moving continuously, the tape may also be moved incrementally, or made to stand still, while the rotary head is continuously scanning the servo field and data tracks. When the tape is stationary, such as when repetitive scanning of a data track is desired, a positional adjustment may be made by a step motor for example, in accordance with the DC voltage error supplied to the closed feedback loop that includes the motor.

Furthermore, the apparatus of this invention may use a single transducer for read, write and servo functions; or one transducer for write only, and a second transducer for reading data and servo signals; or two transducers, one for writing, one for reading, and both reading servo data; or two transducers for reading and writing respectively, with the write transducer reading servo signals and the read transducer reading data only. In addition, the transducers may be spaced 180° apart and both transducers may sample the servo signals. More than two transducers may be used on a single rotary head assembly. The head assembly may also be a reciprocating linear scan in lieu of a rotary head.

Significant advantages of this novel data tape system are increased track density, a fast data rate, with low tape speed and reduced hardware cost. The high increase in track density is obtained without signal distortion.

It should be recognized that various modifications may be made in the apparatus, including the tape drive configuration and associated servosystem, without departing from the scope of this invention. It should be understood that the invention is applicable to helical, transverse, and oblique patterns registered as discrete discontinuous tracks across a longitudinal tape. Also, the magnitudes and polarities of voltages or other signals recited herein are not limiting but only given for purpose of example.

What is claimed is:

1. A magnetic tape recording system wherein data tracks are registered obliquely or transversely along the longitudinal path of the magnetic tape, including a magnetic head assembly having at least one transducer for scanning the discrete data tracks, said tape characterized by a pattern of servo reference signals registered along the length of said tape prior to recording of data signals, said reference signals having different characterizations alternating successively along said tape length, such that the center line of the associated data track in the direction of scan bears a fixed relation with the boundary between adjacent servo reference signals of different characterizations; comprising circuit selection means for actuating servo signal readout during one portion of a single scan of said head assembly along said data track and for actuating reading and/or writing of data along said data track for another portion of such single scan;

means for sensing said servo signals and for producing an error signal representative of the position of said transducing gap relative to the center line of the data track to be scanned during said one portion of said single scan; and means for adjusting the position of said tape in the direction of motion of said tape, relative to said head scan path in response to said error signal so that said scan path effectively straddles the center line of said data track during recording or reading, said sensing of said servo signals, and the reading and/or writing of data, and said tape position adjusting occurring during each single scan of said head assembly.

2. A magnetic tape recording system as in claim 1, wherein said center line is collinear with said boundary.

3. A magnetic tape recording system as in claim 1 wherein said sensing and error signal producing means comprises a phase locked oscillator.

4. A magnetic tape recording system as in claim 1, wherein said head assembly is a rotary head assembly.

5. A magnetic tape recording system as in claim 4, wherein said rotary magnetic head assembly includes a write transducer, and a read transducer spaced close to said write transducer, so that data may be recorded and read during a single revolution of the head assembly.

6. A magnetic tape recording system as in claim 5, including means for reading said servo pattern and for writing data during the same revolution of said head assembly, said reading and writing means comprising said write transducer.

7. A magnetic tape recording system as in claim 4, including a rotary shaft to which said head assembly is mounted, and an index pulse generating means coupled to said shaft for producing an index pulse for each revolution of said head assembly.

8. A magnetic tape recording system as in claim 7, including a phase locked oscillator that is synchronized to said index pulse generating means.

9. A magnetic tape recording system as in claim 4, including a motor for driving said tape, wherein said position adjusting means comprises a servo system including a closed feedback loop coupled to said motor for varying the speed and position of said tape relative to said rotary head assembly.

10. A magnetic tape recording system as in claim 9, wherein said servo system includes a differential peak detector coupled to the output of said rotary head assembly and a sample and hold circuit coupled to the output of said peak detector.

11. A magnetic tape recording system as in claim 9, wherein said motor is a step motor for advancing said tape incrementally.

12. A magnetic tape recording system as in claim 11, wherein said closed feedback loop comprises a variable monostable multivibrator for controlling the step rate of said step motor.

13. A method of processing data signals in a helical or transverse scan type recording system having a rotary head assembly comprising:

reading a servo pattern prerecorded on said tape prior to the data recording and reading modes;

switching to a write mode for writing data tracks that relate in position to the servo signal pattern; and reading said written data tracks;

the reading of said servo signal pattern, the writing of said data, and the reading of said data, all occurring substantially within a single revolution of said rotary head assembly.

14. A method as in claim 13, wherein said reading of said servo pattern is performed by a write transducer that also writes said data tracks.

* * * * *